3,824,196
CATALYST SUPPORT
John Jones Benbow and Leslie Waddington Lord, Stockton-on-Tees, England, assignors to Imperial Chemical Industries Limited, London, England
Filed May 1, 1972, Ser. No. 248,887
Claims priority, application Great Britain, May 7, 1971, 13,721/71
Int. Cl. B01j 11/06
U.S. Cl. 252—455 R            9 Claims

ABSTRACT OF THE DISCLOSURE

A catalyst support in the form of a multi-tubular refractory module is made by forming a plastic composition containing the material of the support or a compound thermally decomposable or retractable thereto, a liquid and a viscosity-controlling substance, forcing the said composition successively through a zone comprising a plurality of discrete primary channels within a solid block and then a unifying zone comprising secondary channels within the same block, the secondary channels being interlinked in the configuration of continuous curves transverse to the direction of flow of the plastic composition, drying the module thus produced and calcining it to cause the formation of ceramic bonds.

---

Figure 1:
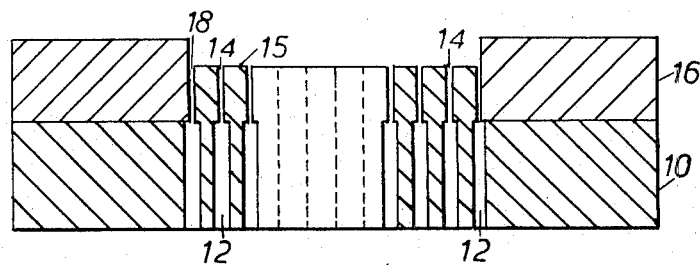

This invention relates to a method of making a refractory support, a catalyst supported thereon and a process using the catalyst.

Refractory catalyst supports in the form of blocks of ceramic having parallel through passages have recently received much study as the result of the low resistance they afford to the passage of gas. Such low resistance is especially important when the catalyst is to be used for reacting substantances present in low proportions, such as nitrogen oxides in exhaust gases from internal combustion engines or ammonia oxidation plants, since the volume rate of gas passing through the catalyst is often very large. It has been proposed to make such catalyst supports by various methods, principally by extruding thin sheets of refractory, corrugating them and joining them side-by-side, or by forming blocks of aluminium and oxidising them, or by making the required block from paper, coating it with oxidic material and firing the coated block to burn out the paper and sinter the oxidic material.

We have now devised a method by which supports of this type can be made in a single stage of fabrication.

According to the invention there is provided a method of making a catalyst support in the form of a multi-tubular refractory module in which the tube axes are mutually parallel which comprises forming a plastic composition containing the material of the support or a compound thermally decomposable or reactable thereto, a liquid and a viscosity-controlling substance soluble in or swellable by the said liquid, forcing the said composition successively through a zone comprising a plurality of discrete primary channels within a solid block and then a unifying zone comprising secondary channels within the same block, the secondary channels being interlinked in the configuration of continuous curves transverse to the direction of flow of the plastic composition, the aggregate cross-sectional area of the secondary channels being sufficiently less than that of the primary channels and the time of passage through the secondary channels being sufficiently long to effect unification of the feed into a module, drying the module thus produced and calcining it to cause the formation of ceramic bonds.

In order to decrease the temperature at which ceramic bonds are formed, the plastic composition may contain also a ceramic binding agent, suitably a clay, such as kaolin or bentonite, suitably to the extent of up to 20%, especially 2.5 to 10%. When the ceramic binding agent is water-swellable it affects the viscosity of the composition and may act as the viscosity-controlling substance; usually, however, it is preferred to have present also an organic polymer as viscosity-controlling substance. The ceramic binding agent may constitute a greater part of the material of the support, as described below.

The expression "continuous curve" includes a straight line, which is, indeed, the most convenient configuration.

The cross-section of each complete module is preferably triangular, rectangular or hexagonal, conveniently parallel to the tube-separating walls so that a plurality of modules can be disposed side-by-side so as to fill the cross-sectional area of containing vessels of various sizes, thus making possible catalytic reactors having a capacity variable over as wide a range, in principle, as may be desired. Such modular combinations and reactors containing them constitute a further feature of the invention. If desired, modules, of which some have narrow tubes and some have wider tubes can be used in combination. The outer cross section of each module can be for example circular or elliptical in outline, irrespective of the cross-sectional shape of the tubes.

Preferably an outer secondary channel is provided about the periphery of the tube-forming secondary channels, so that the module has a continuous outer wall, since this affords greater mechanical strength.

The rate of feed is preferably substantially the same in all the primary and secondary channels, whereby the tubes are straight, but may for example increase from one side of the plane of the passages to the other, thus producing a curved module, which may be needed to fit the shape of special reactors. If a zig-zag configuration is required in order to increase the turbulence of fluid flow, the rate of feed is alternated during the extrusion operation as between one side of the plane of the passages and the other side.

The spacing of the secondary channels is preferably such that the tubes have an internal cross-sectional area up to 100 mm.$^2$, for example 0.16 to 16 mm.$^2$ and more especially 0.25 to 2.0 mm.$^2$. The width of the secondary channels controls the tube wall thickness and depends on the mechanical strength and thermal properties required; it is suitably in the range 0.05 to 1 mm., but can be larger if desired, e.g. up to 2 mm. The wall thicknesses need not be uniform: in a module especially useful when the catalytic reaction is subject to starting and stopping at intervals, some walls are in the range 0.1 to 0.5 mm. thick, others in the range 0.5 to 2 mm. thick. The catalyst on the thin walls can thus be rapidly warmed up, whereas the catalyst on the thick walls cools only slowly. It is within the invention to have localised thickened wall portions between or at wall intersections, or to have some walls of tapering thickness. The outer wall can be thicker than the inner walls in order to increase the mechanical strength of the module. The method is especially suitable for making modules having 200–600 passages per square inch, and for tube walls 0.1 to 0.4 mm. thick.

The plastic composition may be formed from any oxide or oxide mixture which affords the desired refractory properties. One possible oxide mixture contains a hydraulic cement and a finely divided aggregate. Low-silica aluminous cements, such as those available under the Registered Trade Marks "Ciment Fondu," "Secar" and "Alcoa" are preferred especially when the temperature of use is to be above 750° C. The aggregate can be for example alumina, titania, zirconia, mullite or calcined kaolin. An especially useful material for the support consists predominantly of alumina with a minor quantity of clay, and possibly also an oxide of copper or titanium. The alumina is suitably alpha alumina, formed by calcination of other aluminas at 1000–2000° C., and is for example the alumina sold under the name "tabular alumina." A further very useful material is a refractory spinel, especially magnesia-alumina spinel.

The method of the invention is applicable whether the material of the support is present in the plastic composition as such or as a compound decomposable thereto. In one extreme case the material is present as stable undeformable particles, of which the above-mentioned aluminas formed by calcination at 1000–2000° C. are examples; other examples are magnesia-alumina spinel, zirconia, zirconium silicate and mullite. When using such materials it is desirable to control the particle diameter distribution such that the smaller particles (under 5 microns) substantially fill the voids between the larger particles (over 5 microns). Under such control the strength of the module is maximised; the density is also correspondingly greater but this is of little significance because the high strength enables very thin tube walls to be used. At the same time it is found that the rheological properties of the plastic mixture are better if substantially all the non-deformable particles are greater than 2.5 microns in diameter, and still better if the following limits are observed: Under 5 microns less than 35%, under 10 microns, less than 70%, under 45 microns, 100%. If these limits are exceeded the plastic composition does not pass at a uniform rate through the secondary passages, and consequently tearing results if it is attempted to make modules of more than a critical length, which varies according as the composition is near to or further from the above limits.

In another embodiment of the method of the invention the material of the support is present in the plastic composition as deformable insoluble particles to the extent of at least 20%. The most useful type of deformable materials for this purpose are layer-structured oxides and compound oxides, for example, layer-structured aluminas and spinels and minerals such as talc and clays. The weak bonds between the layers of oxide in such materials appear to be readily breakable under the conditions of pug-milling or extrusion or both, and as a result the particles are forced to fill all the possible voids. Such deformable materials are especially useful when they are to undergo a chemical reaction to form the required refractory, for example, a reaction of a divalent oxide such as magnesia with alumina to give spinel or of talc with alumina and clay to give cordierite, at temperatures in the range 1000–1500° C.

If desired, one or more of the components of the refractory material can be present in the plastic composition as a water-soluble compound, which will decompose or react with the other components during the calcination stage.

The micromeritic properties of the support are important to its usefulness. It suitably has a porosity in the range 20 to 40% v./v., as measured by water-uptake. The specific surface of the structural material of which it is formed is suitably in the range 0.01 to 100 m.²/g. but may be higher or lower. Its porosity and specific surface and also its mean pore radius can be varied by control of particle diameter distribution, and/or by suitable choice of the temperature at which it is calcined, a higher calcination temperature usually resulting in an increase in refractoriness and mean pore radius and a decrease in porosity and specific surface.

The invention provides a method of making a modified support (that is, a "combination support") in which a layer of a catalyst-support material ("secondary support") is applied to at least the inside-tube surfaces of the support already described. This combination support thus presents a surface which has micromeritic properties independent of those of the primary support. The layer may be for example an alumina or magnesia or a mixed catalyst support material such as a spinel or cement-bonded alumina or an oxide of calcium, strontium, or barium. It can be formed for example by applying a thermally decomposable salt, such as a nitrate or amine complex, to the support or by applying an aqueous slurry of a hydrated oxide or carbonate; in each such method the wet layer is dried and then calcined to give the required micromeritic properties.

The invention includes also methods of making catalysts comprising the support or modified support and catalytic constituents. As examples of catalytic constituents there may be mentioned:

1. Group VIII metals, especially nickel or cobalt or the platinum group metals, when the catalyst is to be used for reactions of steam or oxygen with hydrogen, hydrocarbons or carbon monoxide, or for the decomposition of nitrogen oxides or ammonia. Such catalysts are especially useful in the non-oxidative treatment of internal combustion exhaust gases at high temperatures such as 700° C. and upwards, especially above 800° C. or at lower temperatures such as 300–700, especially 300–500° C. when the active metal is ruthenium, to remove nitrogen oxides without substantial formation of ammonia. Especially when the active metal is a platinum group metal, preferably palladium or platinum, the catalysts are suitable for the oxidation of internal combustion engine exhaust gases at for examples 200–800° C. to remove carbon monoxide and hydrocarbons; suitably such oxidation follows a preliminary treatment under reductive conditions. Such treatment processes are described in U.S. Application Ser. No. 188,772, filed Oct. 13, 1971. When the active metal is a platinum group metal or mixture, for example platinum alone or with rhodium, the catalyst is useful in the oxidation of ammonia to nitrogen oxides, principally to be converted to nitric acid.

2. Oxides such as those of iron, cobalt, nickel, manganese, rhenium, chromium, molybdenum, tungsten, vanadium, niobium and tantalum and mixtures thereof and with copper oxide. These are principally for oxidation reactions, especially of carbon monoxide and hydrocarbons, for example in the treatment of internal combustion exhaust gases at for example 200–800° C. say 400–600° C. Especially when the oxide is cobalt oxide, the catalyst is useful in the oxidation of ammonia to nitrogen oxides, principally to be converted to nitric acid.

Catalysts made by the method of the invention can be of the simple type in which the catalytic material adheres directly to the support or modified support; these can be simply made by adding to the method the further step of impregnation with a soluble salt. In a more elaborate form of the method leading to useful catalysts affording a greater active area, the catalytic material is applied to the surfaces of the support or modified support in the form of coherent particles, each bonded together by compression or sintering or by added binding agent or carrier material or several such means, and caused to adhere to the surface. The coherent particles are suitably from 0.001 to 1.0 mm. in diameter, depending on the internal diameter of the tubes and on the active area required. Adhesion can be effected by for example a hydraulic cement or a sintered or fused vitreous enamel. The coherent catalyst particles are suitably formed by grinding and classifying catalyst particles formed by conventional methods such as pelleting, extrusion or granulation.

As a further alternative the method of the invention may be applied to catalytic material homogeneously mixed with the support material or, in the extreme case, to catalytic material alone acting as an aggregate to be bound together by the binding agent. Such catalysts have the disadvantage that much of the catalytic material present is not in contact with the reactant fluid, especially if the reactant substances do not diffuse readily.

In a useful type of catalyst that can be made by the method according to the invention a length of support or modified support carries one catalyst for part of its length only, the remainder of its length carrying one or more other catalysts. An important example is a catalyst for treatment of internal combustion exhaust gases at above 400° C., in which the inlet end of the catalyst carries a platinum group metal in order primarily to oxidise carbon monoxide and hydrocarbons, thus heating the gas stream, and the rest of the catalyst carries a Group VIII base metal or its oxide in order primarily to decompose nitrogen oxides and ammonia and to react any residual hydrocarbons with steam.

In the plastic composition, the main constituents of which have already been described, the ceramic binding agent is suitably bentonite or some other water-swellable clay. The soluble or swellable organic polymer can be for example starch, a cellulose ether or ester, a polyvinyl alcohol, ester or ether, or a protein; if containing such polymers the extruded module should be calcined at a high enough temperature to decompose or burn them out. This enables a more porous support to be produced. Control of porosity can be exercised by choice of the polymer; thus for a given degree of plasticity in the composition to be extruded there can be used either (for lower porosity) a small quantity of a high-viscosity polymer or (for higher porosity) a larger quantity of a lower viscosity polymer.

The plastic composition is preferably "pugged," that is, mixed in conditions of shear, before extruding it.

In order to provide the continuous outer wall of the catalyst support the extrudate is fed through an outer secondary channel ("forming-aperture"), the outer primary channels being sufficient in capacity to provide the feed required to coalesce over the area of the outer secondary channel. Suitably the forming-aperture is integral with the block or fixed to it, so that the continuous outer wall is formed simultaneously with the tube walls. The forming-aperture may or may not be parallel with the secondary channels ("die-apertures"), depending on the cross-sectional shape required.

Figure 2:
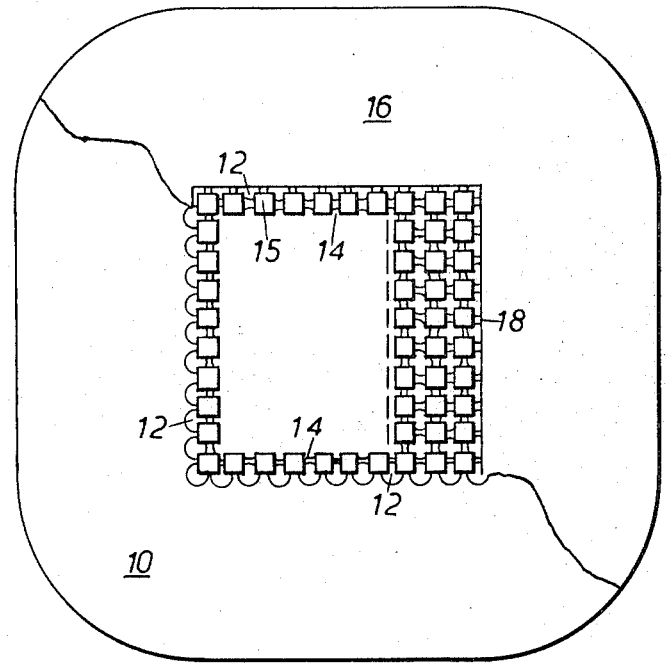

The succession of primary and secondary channels characterising the method of the invention can be provided by a die as shown in the accompanying drawings, in which FIG. 1 shows the die in sectional elevation, together with the outer secondary channel; and FIG. 2 shows the die in plan, with a cut-away partial view of the outer secondary channel.

The die consists of block 10 formed with circular-section primary channels 12 and with secondary channels 14. It has been fabricated from a block of metal, originally of thickness equal to the total vertical length of primary channels 12 and secondary channels 14, by machining away the part of its thickness outside the secondary channel area. Secondary channels 14 were formed by saw-cutting along parallel perpendicular lines in the central thick portion of the block, thus leaving separator-blocks 15. Primary channels 12 are bored in line with the intersections of the saw cuts and have a total cross-sectional area slightly greater than that of the primary channels and outer secondary channel 18, so as to ensure that sufficient material is supplied to fill the secondary channels. Outer secondary channel 18 is held in position by means not shown, for example screws or clamping-frame.

In alternative dies, secondary channels may be formed by saw-cutting the central thick portion of the block additionally along one or both diagonals of the separate-blocks 15. The saw-cuts can, if desired, be arcuate. Outer secondary channel 18 can be other than square in shape, for example circular or elliptical. If desired, the secondary channels can be partly blanked off, whether or not the outer channel is used, in order for example to provide an outer circular or elliptical shape or a hollow centre. As a further possibility the channels need not be mutually perpendicular, for example, they may conveniently be at an angle of 60°.

Whereas, in the drawings, one primary channel has been shown at each intersection of secondary channels, this is preferred only when all the separator-blocks are equilateral in cross-section, fewer being otherwise sufficient. In order to vary the rate of extrusion across the die, the face of the separator blocks 15 can be convex or concave and the sizes of the primary channels can differ.

In the Examples the die was made of 3% chromium steel.

EXAMPLE 1

Extrusion of alumina modules

A mixture of 95 parts of tabular alumina (previously calcined at 2000° C.) of particle size up to 90 microns was mixed with 5 parts of bentonite, 5 parts of "Kordek" pre-cooked starch powder and 16 parts of water. The mixture was pug-milled until homogeneous and then extruded through a die similar to that shown in the drawing but having diagonally once-bisected square separator-blocks, giving a total of 128 triangular separator-blocks per square inch. The wet extruded material was supported on a flat surface, cut off into lengths and dried by passing air at 100° C. through its passages. The dry units resulting were heated gradually to 1050° C. over 20 hours to form ceramic bonds and to burn out the starch. The specific surface of the resulting module was under 1 m.$^2$/g.

It was converted to a catalyst by impregnation with magnesium nitrate, which was then calcined to oxide; and then with cobalt nitrate, which also was calcined to oxide. The catalyst was effective at 800° C. in removing hydrocarbons froms internal combustion engine exhaust gases whether or not these contained added oxygen.

Note: the alumina used in this example was a blend of 3 grades supplied by Universal Abrasives Co., as follows: 1200 grade 52% by weight, 400 grade 31% by weight, 240 grade 17% by weight. In this blend the proportion of particles under 5 microns was 30% and the proportion under 10 microns 51% by weight.

EXAMPLE 2

Effect of particle-size distribution on extrusion of undeformable alumina

The method of the first paragraph of Example 1 was repeated using alpha alumina mixtures of various particle diameter distributions, with a die having 512 half-square cores per square inch made by cutting 16 cores per linear inch and then bisecting diagonally in alternate directions. The wall thickness was 0.25 mm. In addition a fifth module (sample E) containing 20% by weight by very fine-grained alumina under 2.5 microns was extruded. The Table shows the particle sizes cumulatively for each sample. It is evident that samples B and C show the highest strength after calcination and resistance to tearing during extrusion; it was calculated that the small particles in these samples filled but did not overfill the spaces between the larger particles.

TABLE I

| Particle diameter microns: | A | B | C | D | E |
|---|---|---|---|---|---|
| Under 2.5 | 0 | 0 | 0 | 0 | 5 |
| 3 | 0 | 3 | 3 | 5 | 8 |
| 4 | 0 | 13 | 18 | 20 | 20 |
| 5 | 0 | 25 | 34 | 40 | 35 |
| 7.5 | 7 | 41 | 54 | 65 | 54 |
| 10 | 36 | 60 | 69 | 77 | 69 |
| 15 | 63 | 76 | 82 | 86 | 82 |
| 20 | 66 | 77 | 83 | 87 | 83 |
| 25 | 71 | 69 | 85 | 88 | 85 |
| 30 | 79 | 86 | 90 | 93 | 90 |
| 35 | 93 | 94 | 98 | 99 | 98 |
| 40 | 98 | 99 | 99 | 99 | 99 |
| 45 | 100 | 100 | 100 | 100 | 100 |
| Comments | (1) | (2) | (2) | (3) | (4) |

[1] No tearing. Strength only half that of B and C.
[2] No tearing, strong modules.
[3] Some tearing.
[4] Serious tearing.

The plastic compositions for Example 1 and this Example had been made by mixing grades of alpha alumina supplied by Universal Abrasives Ltd, under the sieve reference numbers 1200, 600 and 320. In addition a quantity of very fine gamma alumina was used in making sample E. The proportions used are shown in Table 2.

TABLE 2

| Sample | A | B | C | D | E |
|---|---|---|---|---|---|
| Grade: | | | | | |
| Gamma | | | | | 20 |
| 1200 | 0.0 | 40 | 54 | 64 | 44 |
| 600 | 61 | 37 | 28 | 21 | 22 |
| 320 | 39 | 23 | 18 | 15 | 14 |

EXAMPLE 3

Extrusion of alumina/nickel oxide mixtures

Example 2 (sample C) was repeated but with a mixture of 80% alumina and 20% nickel oxide, by weight. The nickel oxide was substituted for the finest component of the alumina ("grade 1200"). Two types of nickel oxide were used, namely relatively coarse purchased material (sample F) and material made by calcining precipitated washed nickel carbonate at 420° C. (sample G). Table 3 shows the particle sizes cumulatively for each sample. It is evident that sample F, containing the smaller proportion of fine material showed better extrusion behaviour. It was calculated that the small particles in sample G over-filled the spaces between the larger particles.

TABLE 3

| Particle diameter, microns: | E | F |
|---|---|---|
| 2.5 | 0.1 | 20 |
| 5.0 | 24 | 42 |
| 7.5 | 42 | 57 |
| 10 | 59 | 69 |
| 15 | 80 | 80 |
| 20 | 82 | 82 |
| 30 | 89 | 89 |
| 40 | 99 | 99 |
| 45 | 100 | 100 |
| Comments | (1) | (2) |

[1] Substantially no tearing.
[2] Serious tearing.

EXAMPLE 4

Extrusion of cordierite module

Example 2(c) was repeated using a mixture of 50 parts of talc, 25 parts of bentonite, 25 parts of alumina, 15 parts of "Kordek" and sufficient water for extrudable consistency. Despite the fact that the particle diameters were substantially less than 2 microns, the extrusion proceeded smoothly without tearing. After calcination for 16 hours at 1260° C. to give substantial conversion to cordierite the module was equal in strength to module of Example 2.

EXAMPLE 5

A catalyst support module by the method of Example 2(c) was impregnated with a melt of nickel nitrate hexahydrate to give a catalyst containing 14.2% by weight of NiO.

The catalyst was tested by passing over it a simulated exhaust gas having the composition $NO_x$ 1500 p.p.m., $O_2$ 0.3%, $H_2$ 0.7%, $SO_2$ 10 p.p.m., hydrocarbon 300 p.p.m. as $C_3$, CO 2.0%, $CO_2$ 13%, $H_2O$ 15%, $N_2$ remainder, at a space velocity of 50,000 hour$^{-1}$ and a temperature of 800° C., and measuring the proportion of nitrogen oxides and ammonia in the outlet gas. It was found that 98% of the inlet $NO_x$ was converted to nitrogen, practically none to ammonia, and hence the treated gas was suitable for an oxidation step as in Example 6.

EXAMPLE 6

A catalyst support module having 512 right-triangular apertures per square inch was made by the method of Example 2(c). A catalyst was made from this support by impregnating with an aqueous solution of palladium nitrate containing nitric acid, then drawing, reducing with dilute hydrazine hydrate, draining and drying.

The catalyst was tested by passing over it a gas of composition $H_2$ 1%, CO 2.5–3.0%, $O_2$ 3.5–4.0%, $CO_2$ 15%, $H_2O$ 15%, $N_2$ remainder at a space velocity of 60,000 hour$^{-1}$ and an inlet temperature of 700° C. The conversion of CO was 97%.

What is claimed is:

1. A method of making a refractory metal oxide catalyst support in the form of a multi-tubular calcined refractory module in which the tube axes are mutually parallel which comprises forming a plastic mixture comprising the refractory metal oxide catalyst support or with a compound thermally decomposable thereto, water and a viscosity-controlling polymer which is soluble or swellable by water selected from the group consisting of starch, a cellulose ether, a cellulose ester, polyvinyl alcohol, a polyvinyl ester, a polyvinyl ether and a protein, forcing the said mixture successively through a zone comprising a plurality of discrete primary channels within a solid block and then a unifying zone comprising secondary channels within the same block, the secondary channels being interlinked in the configuration of continuous curves transverse to the direction of flow of the plastic composition, the aggregate cross sectional area of the secondary channels being sufficiently less than that of the primary channels and the time of passage through the secondary channels being sufficiently long to effect unification of the feed into a module, drying the module thus produced and calcining it to cause the formation of ceramic bonds.

2. A method according to claim 1 in which the plastic mixture contains a clay as a ceramic binding agent.

3. A method according to claim 1 in which the material of the support is present in the plastic mixture to the extent of at least 20% as refractory metal oxide having a layered structure.

4. A method according to claim 1 in which an outer secondary channel is provided about the periphery of the tube-forming secondary channels, whereby the module is formed with a continuous outer wall.

5. A method according to claim 1 in which the width of the secondary channels is in the range 0.05 to 1.0 mm.

6. A method according to claim 1 in which the separation of the secondary channels is such as to afford tubes having an internal cross-sectional area in the range 0.16 to 16 mm$^2$.

7. A method according to claim 1 in which the plastic mixture comprises an extrudable mixture of a refractory metal oxide, catalyst support water, the water-soluble or -swellable viscosity-controlling polymer and clay.

8. A method according to claim 7 wherein the oxide comprises alpha aluminum and the polymer is starch.

9. A method according to claim 3 wherein mixture contains talc, clay and alumina and the calcination is continued until these have been substantially reacted to produce cordierite.

References Cited

UNITED STATES PATENTS

| 3,428,424 | 2/1969 | Keith | 252—477 R |
| 3,489,809 | 1/1970 | Keith et al. | 252—477 R |
| 3,565,830 | 2/1971 | Keith et al. | 252—477 R |
| 3,692,497 | 9/1972 | Keith et al. | 423—213 X |
| 1,873,707 | 8/1932 | Harnsberger et al | 252—477 R |
| 2,730,434 | 1/1956 | Houdry | 252—477 R |
| 3,502,596 | 3/1970 | Sowards | 252—477 R |

DANIEL E. WYMAN, Primary Examiner

WILLIAM J. SHINE, Assistant Examiner

U.S. Cl. X.R.

252—463, 477 R; 423—213.2